(12) United States Patent
Yang et al.

(10) Patent No.: US 10,935,819 B2
(45) Date of Patent: Mar. 2, 2021

(54) CONCEPTS PERTAINING TO INTEGRATED SENSOR AND OPTICAL PHASE/AMPLITUDE MODULATOR

(71) Applicant: California Institute of Technology, Pasadena, CA (US)

(72) Inventors: Changhuei Yang, South Pasadena, CA (US); Sylvain Gigan, Paris (FR)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 243 days.

(21) Appl. No.: 16/016,193

(22) Filed: Jun. 22, 2018

(65) Prior Publication Data

US 2018/0373065 A1  Dec. 27, 2018

Related U.S. Application Data

(60) Provisional application No. 62/523,942, filed on Jun. 23, 2017.

(51) Int. Cl.
  *G02F 1/01*  (2006.01)
  *G02F 1/19*  (2019.01)
  *G02F 2/00*  (2006.01)

(52) U.S. Cl.
  CPC .............. *G02F 1/0121* (2013.01); *G02F 1/19* (2013.01); *G02F 2/004* (2013.01); *G02F 2201/58* (2013.01); *G02F 2203/12* (2013.01)

(58) Field of Classification Search
  CPC .......... G02F 1/0121; G02F 1/19; G02F 2/004; G02F 2203/12; G02F 2201/58
  See application file for complete search history.

(56) References Cited

U.S. PATENT DOCUMENTS

| 5,565,986 A | 10/1996 | Knuttel |
| 8,451,450 B2 | 5/2013 | Heng |
| 9,466,938 B2 * | 10/2016 | Dupret ................. G03H 1/0443 |
| 2011/0122416 A1 | 5/2011 | Yang et al. |

FOREIGN PATENT DOCUMENTS

KR     10-1599147     3/2016

OTHER PUBLICATIONS

Laforest, T., et al., "A 4000 Hz CMOS image sensor with in-pixel processing for light measurement and modulation", 2013 IEEE 11th International New Circuits and Systems Conference (NEWCAS), Jun. 2013, pp. 1-4.

(Continued)

*Primary Examiner* — Tony Ko
(74) *Attorney, Agent, or Firm* — Gates & Cooper LLP (57) ABSTRACT

An integrated sensor and optical phase/amplitude modulator device including a modulator stacked on or above a detector. A circuit receives a signal outputted from the detector in response to an input field irradiating the detector. The circuit performs binary operations comprising classifying the input phase of the input electromagnetic radiation into one of two ranges and setting the modulator into one of two states depending on which range the input phase is classified into. The modulator transmits output electromagnetic radiation having an output field modulated according to the state of the modulator set by the circuit.

20 Claims, 5 Drawing Sheets

(56) References Cited

OTHER PUBLICATIONS

Cui, M., et al., "Implementation of a digital optical phase conjugation system and its application to study the robustness of turbidity suppression by phase conjugation", Optics Express, Feb. 15, 2010, pp. 3444-3455, vol. 18, No. 4.
Wang, D., et al., "Focusing through dynamic tissue with millisecond digital optical phase conjugation", Optica, Aug. 2015, pp. 728-735, vol. 2, No. 8.
Forth Dimension Displays, http://www.forthdd.com/products/, as downloaded Jul. 23, 2019, pp. 1-5.
PCT International Search Report dated Oct. 29, 2018 for PCT application No. PCT/US2018/039085.

* cited by examiner

FIG. 5

CONCEPTS PERTAINING TO INTEGRATED SENSOR AND OPTICAL PHASE/AMPLITUDE MODULATOR

CROSS REFERENCE TO RELATED APPLICATIONS

This application claims the benefit under 35 U.S.C. Section 119(e) and commonly-assigned U.S. Provisional Patent Application Ser. No. 62/523,942, filed on Jun. 23, 2017, by Changhuei Yang and Sylvain Gigan, entitled "CONCEPTS PERTAINING TO AN INTEGRATED SENSOR AND OPTICAL PHASE/AMPLITUDE MODULATOR," CIT-7811), which application is incorporated by reference herein.

STATEMENT REGARDING FEDERALLY SPONSORED RESEARCH AND DEVELOPMENT

This invention was made with government support under Grant No. HR0011-15-2-0003 awarded by the DARPA. The government has certain rights in the invention.

BACKGROUND OF THE INVENTION

1. Field of the Invention

This invention relates to a method and system for modulating electromagnetic radiation.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Focusing light through highly scattering media is an important challenge in biomedical imaging, colloidal optics, and astronomy. When light propagates through strongly scattering samples, refractive index inhomogeneities scatter the light field in many directions. This was long thought of as a randomizing process, which precludes the formation of a sharp focus. However, by taking advantage of the deterministic nature of scattering, researchers in the field of complex wavefront shaping have demonstrated that light can be focused at an arbitrary location within and across scattering media—by shaping the input wavefront reaching the sample with a spatial light modulator. For example, an optical phase conjugate (OPC) copy of an initial transmission through a turbid (e.g., biological) sample can undo the effects of the initial scattering. However, conventional digital optical phase conjugation devices [3] require time consuming alignment of the wavefront sensing device and the optical phase conjugation device. Thus, near-instantaneous time reversal at optical resolutions required for practical applications remains elusive.

What is needed then, is a device capable of generating an optical phase conjugate more efficiently. The present disclosure satisfies this need.

SUMMARY OF THE INVENTION

A device including a modulator stacked on or above a detector; and a circuit connected to the modulator and the detector. The detector outputs a signal in response to input electromagnetic radiation (e.g., received from a turbid medium). The circuit analyzes the signal to determine an output field (e.g., a phase conjugate or approximation of a phase conjugate) that is tailored for a particular application (e.g., an output field that is transmitted more effectively through the turbid medium).

In one or more examples, the circuit performs binary operations comprising classifying the input phase of the input electromagnetic radiation into one of two ranges and setting the modulator into one of two states depending on which range the input phase is classified into.

The device can be embodied in many ways including, but not limited to, the following:

1. The circuit determining from the signal whether the input field of the input electromagnetic radiation has an input phase P in a first range or a second range:
    (i) the first range comprising $P>0$ and the second range comprising $P<0$, or
    (ii) the first range comprising $0+B \leq P \leq \pi+B$ and the second range comprising $P<0+B$ or $P>\pi+B$, where $0 \leq B \leq 2\pi$.

The circuit sets the modulator into a first state if the phase P is in the first range and sets the modulator into a second state if the phase P is in the second range.

The modulator in the first state or the second state modulates output electronic radiation so that the output electronic radiation, comprising an output amplitude and/or an output phase controlled/configured by the modulator, is transmitted from the modulator.

2. The device of embodiment 1 wherein the first range comprises $P>0$ and the second range comprises $P<0$.
3. The device of embodiment 1 wherein the first range comprises $0+B \leq P \leq \pi+B$ and the second range comprises $P<0+B$ or $P>\pi+B$, where $0 \leq B \leq 2\pi$.
4. The device of embodiment 1 wherein the first state sets the output field to have the output phase of $0+C$ radians and the second state sets the output field to have the output phase $\pi+C$, where $0 \leq C \leq 2\pi$.
5. The device of any one of the previous embodiments, wherein the output field is a phase conjugate of the input field.
6. The device of any one of the previous embodiments, wherein the first state comprises the modulator being reflective or emissive and the second state comprises the modulator being non-reflective or non-emissive, so that output electromagnetic radiation is reflected or emitted from the modulator when the modulator is in the first state and the output electromagnetic radiation is not reflected (or not emitted) from the modulator when the modulator is in the second state. In one example, the output electromagnetic radiation (e.g., comprising reference electromagnetic radiation) incident on the modulator is reflected by the modulator in the first state.
7. The device of any one of the previous embodiments, wherein the circuit determines whether the input phase is in the first range or the second range using a process including lock in detection.
8. The device of any of the previous embodiments, wherein the electromagnetic radiation includes reference electromagnetic radiation; and the circuit:
    (i) compares an intensity of the signal outputted from the detector with and without the input field irradiating the detector; and
    (ii) determines whether the intensity of the signal increases or decreases in a presence of the input field.

9. The device of any one of the previous embodiments, wherein the circuit automatically sets the modulator into the first state or the second state upon determination of whether the input phase is in the first range or the second range.

10. The device wherein the circuit sets the output phase to minus theta (−θ) when the input field has the input phase of theta θ.

11. The device of embodiment 10 wherein the output field is a phase conjugate field that is a phase conjugate of the input field.

12. The circuit of any one of the previous embodiments, wherein the circuit is integrated with the modulator and the detector and the input field is not transmitted off the device to an external processor.

13. The device of any one of the previous embodiments, wherein the device comprises an integrated circuit including the modulator, the detector, and the circuit.

14. An apparatus or system comprising a plurality of the devices of any one of the previous embodiments, wherein the devices are disposed in an array and each of the devices comprise a pixel or tile.

15. The device of embodiment 14, wherein the circuit sets the output phase and/or output amplitude of the output field transmitted from each of the pixels so that the output phases and/or output amplitudes vary across the array or from pixel to pixel or from tile to tile.

16. The device of any one of the previous embodiments, wherein the circuit configures or controls the reflectivity/emissivity of the modulator by applying/modulating an electric field applied across liquid crystals between electrodes. The electric field is generated when the circuit applies voltages to the electrodes so as to control the magnitude of the electric field.

17. The device of any one of the previous embodiments, wherein the modulator is a spatial light modulator, a digital micromirror device, or a ferroelectric modulation layer.

In one or more examples, the device comprises a modulator stacked on or above a detector; a circuit connected to the modulator and the detector, wherein the detector outputs a signal in response to electromagnetic radiation irradiating the detector, the electromagnetic radiation including input electromagnetic radiation having an input field; from the signal, the circuit determines an input phase (θ) of the input field; the circuit automatically outputs an output phase x as −θ−π/2≤x≤−θ+π/2 (with optionally also x≠−−θ) to the modulator; and the modulator modulates output electronic radiation so that the output electronic radiation comprising the output phase is transmitted from the modulator. In various examples, the circuit is integrated with the modulator and the detector and the input field is not transmitted off the device to a processor.

BRIEF DESCRIPTION OF THE DRAWINGS

Referring now to the drawings in which like reference numbers represent corresponding parts throughout:

FIG. 3A illustrates an array of devices, according to one or more embodiments, wherein

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Figure 1:
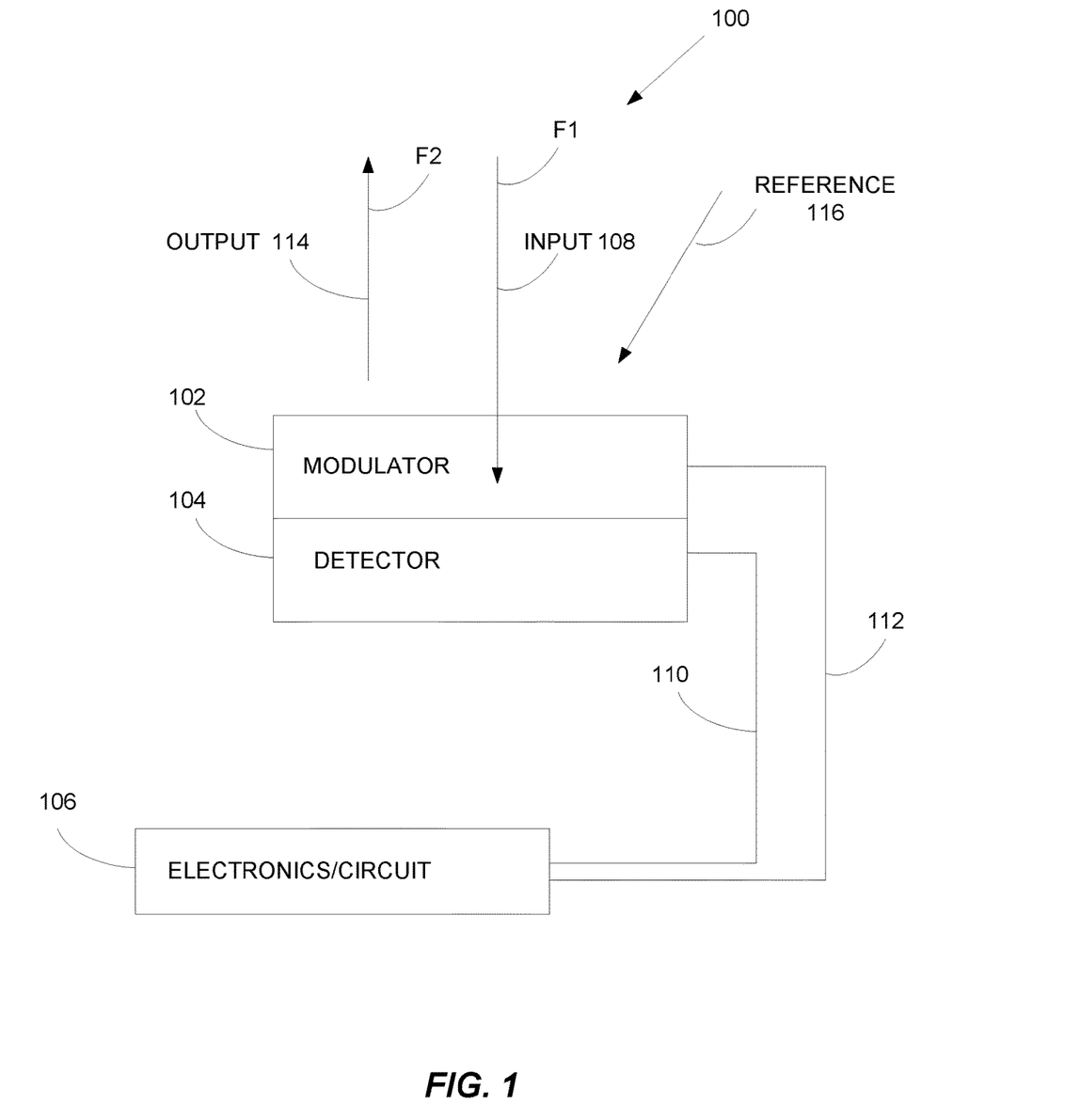
FIG. 1 illustrates a device according to one or more embodiments of the present invention.

FIG. 1 illustrates a device 100 including a layered structure or stack including a modulator 102 on or above a detector 104. The detector 104 detects input electromagnetic radiation 108 (e.g., input light beam) having a signal/input field F1 or wavefront. irradiating/incident on the detector 104 and outputs a detector output signal in response thereto. The detector output signal is transmitted 110 to a circuit 106 (e.g., electronics) and the circuit 106 analyzes the detector output signal to determine or assign an output field F2 associated with the signal/input field F1. The circuit 106 transmits 112 the output field to the modulator 102, or sets the modulator 102 into an appropriate state, so that modulation of output electromagnetic radiation 114 (e.g., light beam) by the modulator forms the output electromagnetic radiation 114 comprising the output field.

In one or more examples, the output field is a phase conjugate field comprising a phase conjugate of the signal/input field or wavefront.

In one or more examples, reference electromagnetic radiation 116 (e.g., reference light beam) is also incident on the device. Reference beam 116 can be interfered with input electromagnetic radiation 108 on detector 104 to form an interference signal used to determine phase and/or amplitude of the signal field or wavefront, e.g., as described in [1] at col. 4 lines 35-57, or col. 9 line 48-col. 10 line 25 describing phase shifting holography.

In one or more examples, the device 100 is a pixel. For example, a plurality of the devices 100 can disposed so as to form an apparatus/system including a pixel array (array of the devices 100 comprising pixels).

In one or more embodiments, the device 100 comprises a monolithic or integrated device, e.g., wherein at least the modulator 102 is integrated with the detector 104. In one or more embodiments, the circuit 106 is also integrated with the modulator 102 and detector 104, so that the layered structure or stack also includes the circuit 106. In one or more examples, modulator 102 comprises a modulator layer, detector 104 comprises a detector layer, and/or circuit 106 comprises a circuit layer, e.g., wherein detector layer, modulator layer, and circuit 106 layer are formed one on top of another.

In one or more embodiments, the device 100 comprises a device as described in U.S. Pat. No. 9,466,938 [1] (e.g., device 38 as illustrated in FIGS. 3-7 in U.S. Pat. No. 9,466,938 [1] and described in associated text). In various examples, detector 104 comprises photodetection device (labeled 52 in [1]), modulator 102 comprises liquid crystal layer(s) (labeled 62, 72 in [1]) between electrodes (labeled 54, 66, 76 in [1]). In one or more of such examples, input electromagnetic radiation 108 comprises light beam 32 and reference 116 comprises reference light beam 36 as labeled in [1]. Device 100 may include further layers or components (e.g., polarizer) as described in [1] as needed to perform the functions described herein.

First Example: Digital Optical Phase Conjugation

In a first example, the output electromagnetic radiation 114 comprises a phase conjugate field emitted or reflected from the device 100 (e.g., pixel). The output field F2 comprising the phase conjugate field is related in phase to the input signal field by a phase sign flip. For example, if the circuit 106 determines from the detector output signal that the input electromagnetic radiation 108 has an input phase equal to theta ($\theta$), then the circuit 106 assigns the output field to have an output phase equal to minus theta ($-\theta$). In one or more examples, the value minus theta is assigned within a range of error, e.g., minus theta$+/-\pi/2$.

In one or more embodiments, the circuit 106 automatically (e.g., without a trigger or control signal) assigns $-\theta$ as the phase of the phase conjugate field upon measurement of $\theta$ for the input phase of the input electromagnetic radiation 108.

Second Example: Amplitude Control

In a second example, the device of FIG. 1 is used to control the amplitude of the output field emitted/reflected from the modulator 102.

In the context of digital optical phase conjugation, the amplitude modulation can be binary and set according to the following rules:
1. The modulator 102 is made reflective/emissive if the incident input/signal field F1 of the input electromagnetic radiation 108 has a phase that is positive, and
2. The modulator 102 is made non-reflective/non-emissive if the input phase of the input electromagnetic radiation 108 is negative.

In these cases, the phase is considered with respect to the phase of a reference field of reference electromagnetic radiation 116 incident on the same detector 104.

These rules for amplitude modulation can be broadened so that the modulator 102 is made reflective if the input phase of the input/signal field F1 has value between 0+B radians to pi+B radians, where B is any chosen constant value (e.g., $0 \leq B \leq 2\pi$). The output phase of the reflected/emitted output field comprising the phase conjugate field is kept constant.

Thus, the circuit 106 performs binary operations comprising classifying input phase of the input electromagnetic radiation into 108 one of two ranges and setting the modulator into one of two states depending on which range the input phase is classified into.

In one or more examples, the circuit 106 connected to the device (e.g., pixel) automatically performs the above described binary operation upon measuring the input phase of the input/signal field, for instance (but not restricted to):
 by determining the input phase (or the phase range) of the input field F1 by lock in detection, or
 by comparing the intensity of the input field F1 detected on the detector 104 with or without the incident input field.

In one or more examples, "automatically" includes performing the binary operation and setting the modulator state without triggering or receiving a control signal after the input phase is determined or classified into a given range.

Third Example: Binary Phase Control

In a third example, the device 100 performs binary phase modulation of the output field emitted/reflected from the modulator 102.

In a digital optical phase conjugation example, the rules for phase modulation are:
1. The modulator 102 conferring an output phase of 0+C radians to the output field F2 if the input phase of the input electromagnetic radiation 108 has value between 0+D radians to pi+D radians, and
2. The output field F2 is set to have an output phase of $\pi+C$ radians otherwise.
3. C and D are any chosen constant values (e.g., $0 \leq C \leq 2\pi$; $0 \leq D \leq 2\pi$).

Thus, the circuit 106 performs binary operations comprising classifying input phase of the input electromagnetic radiation 108 into one of two ranges and setting the modulator into one of two states depending on which range the input phase is classified into.

In one or more examples, the circuit 106 connected to the device 100 automatically performs the binary operation upon measuring the input phase of the input field of the input electromagnetic radiation 108, for instance (but not restricted to):
 by determining the phase (or the phase range) of the input field F1 by lock in detection, or
 by comparing the intensity of the input field F1 of the input electromagnetic radiation 108 detected on the detector 104 with or without the incident input field.

In one or more examples, the phases described herein are modulo a (in particular, for the case where a comparison is made with the value B and it is desired to know whether the phase is between the interval [B$-\pi$, $\pi$] or [B, B$+\pi$].

Fourth Example: Information Contained Entirely within the Device/System

Figure 2:
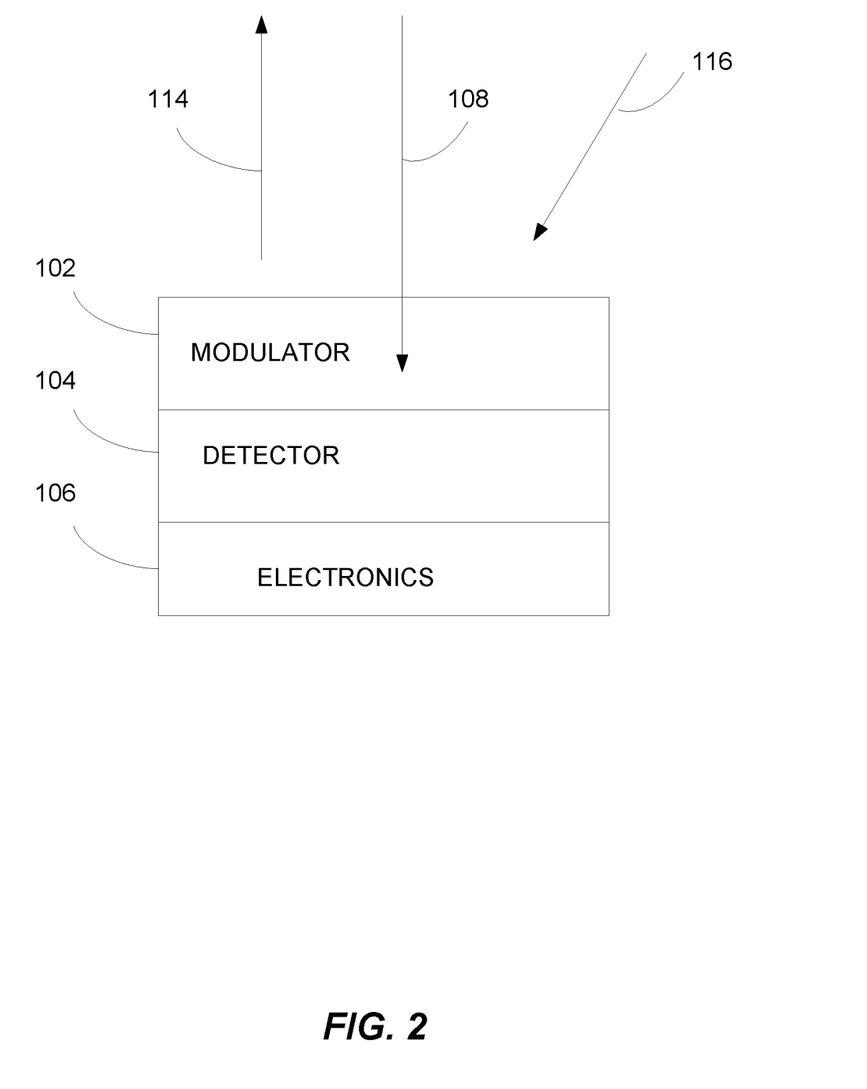
FIG. 2 illustrates an integrated device including the detector, the modulator, and the circuit according to one or more embodiments of the present invention.

In a fourth example, no information (e.g., information regarding the phase or amplitude of the input or output fields) is transmitted out of the device/system 100 (except through the output field of the output electromagnetic radiation 114). Measurements made or data processed at the detector 104 (e.g., sensor pixel layer) or circuit 106 are transmitted directly upwards to the modulator 102, so that the mapping of the input field to an output field occurs in the device 100. This can be achieved, for example, if the circuit 106 determining the input field and/or output field is integrated with or physically attached to the modulator 102 and/or detector 104 in the device 100, as illustrated in FIG. 2.

In one or more examples, the circuit 106 (e.g., electronics) within each device 100 automatically performs the field/wavefront measurements and spatial light modulation (phase conjugation), e.g., without the need for a control input to prompt the processing. The lack of information flow into and out of system (apart from through the output field), by integrating the processing electronics to the device, eliminates data transfer as a potential technology bottleneck in the context of system response speed.

Figure 3A:
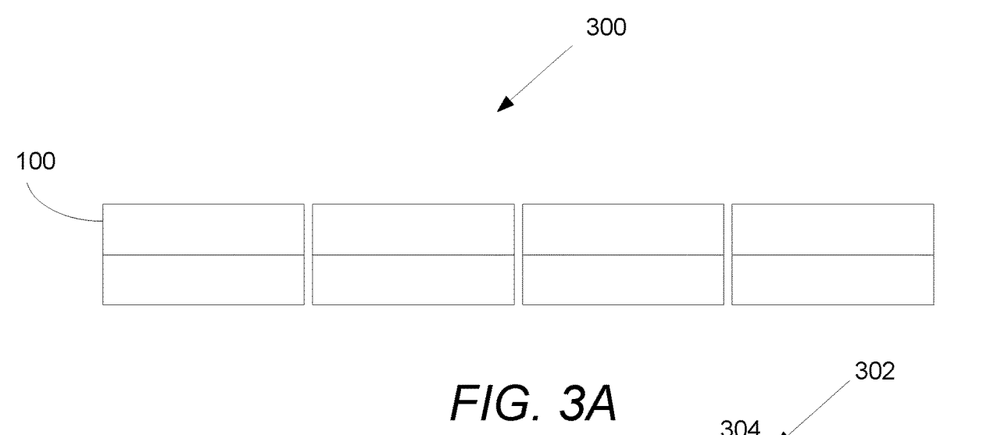
FIG. 3A is a side view and FIG. 3B is a top view.
Figure 3B:
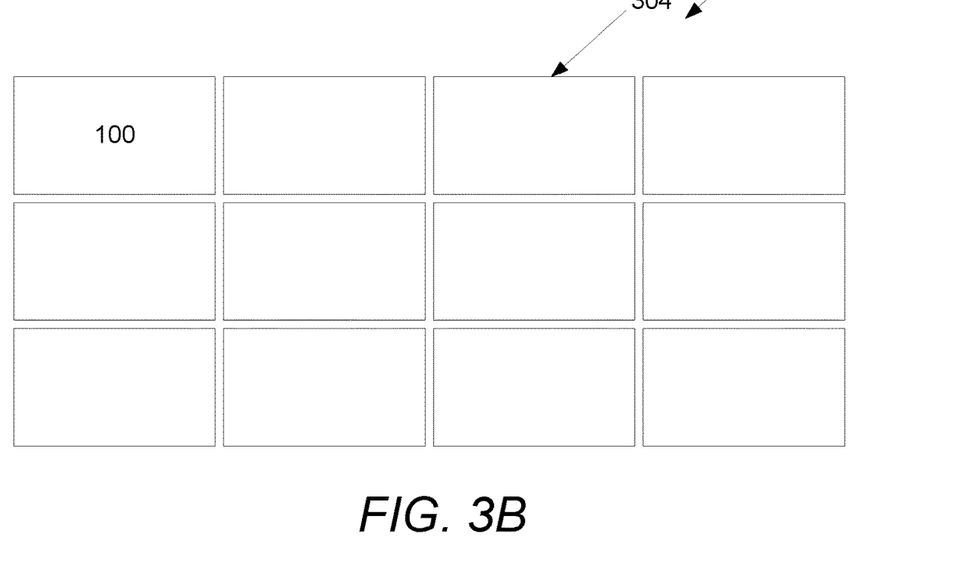

Fifth Example: Tiling of the Device Units to Create a Larger and Scalable Wavefront Sensing and Modulation System FIGS. 3A and 3B illustrate a system 300 including multiple device units 100 assembled spatially together side by side to form an array 302 spanning a larger area and providing wavefront sensing and modulation over a larger area. Such tiling to yield a larger sensing and modulation area is practically prohibitively difficult to do with prior methods [3] because maintaining registration and alignment of the modulator and detector is difficult when the modulator and detector do not form a layered stack. Using the device and processing according to embodiments described herein, however registration and alignment are automatically and rigorously achieved and maintained by the system's 300 architecture. By tiling the devices, the exact position of each device 100 can be characterized and each device can be phase locked in tandem.

Sixth Example

In a sixth example, a system 300 comprising a plurality of the devices 100 (e.g., pixels 304) disposed in an array 302 is provided. A plurality of the devices 100 each output an output field having different phases and amplitudes so that the phase and amplitude of the output electromagnetic radiation 114a, 114b outputted from each device 100 varies spatially across the array 302.

For example, in a variation of the third example, the values of C and D are varied across the pixels 304 (varied pixel 304a to pixel 304b). Such an implementation may be useful in applications where it is desirable to introduce a fixed or variable angular tilt to the phase conjugation or to transform the phase conjugation by adding additional phase skews or curvature.

Seventh Example

In one or more embodiments, modulator 102 comprises a spatial light modulator.

In one or more examples, the modulator 102 comprises a ferroelectric modulation layer [5].

In one or more examples, the modulator 102 comprises a digital micromirror device (DMD) (e.g., instead of place of liquid crystals described in [1]).

Eighth Example: Determining Whether the Input Phase is in the First Range or the Second Range Using a Process Including Lock in Detection The process including lock in detection can proceed as follows.
1. Perform interference of the signal field with a flat reference field.
2. If at the pixel 304 of interest, the interference is found to be constructive (total interference readout >reference power at pixel plus signal power at pixel), then the input phase is in first range. If the interference is found to be destructive, then the input phase is in second range.

Figure 4:
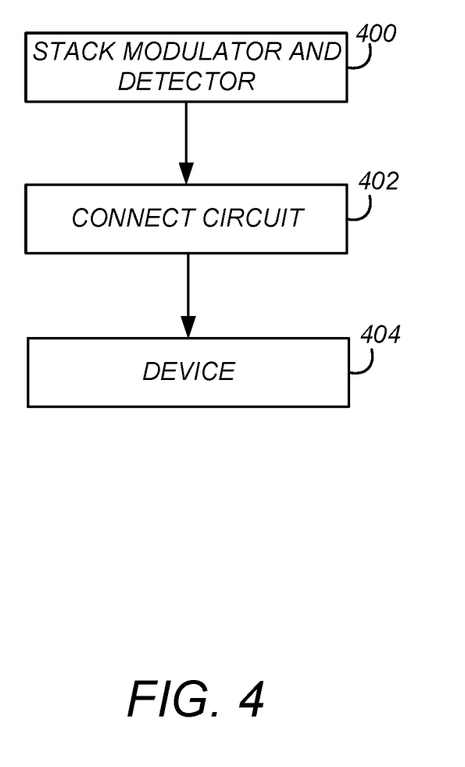
FIG. 4 is a flowchart illustrating a method of fabricating a device, according to one or more embodiments.

Since, in most situations, signal power is << reference power, the signal power term can be neglected.
Process Steps
Fabrication
FIG. 4 is a flowchart illustrating a method of fabricating an integrated sensor and optical phase/amplitude modulator device.

Block 400 represents stacking or depositing or otherwise forming a modulator 102 on or above a detector 104, or integrating the modulator with the detector.

The detector may be sensor (e.g., wavefront sensor), sensor pixel, camera or camera pixel, or photodetector (e.g., photodiode).

The modulator 102 may comprise a spatial light modulator, a ferroelectric modulation layer, or a digital micromirror device (DMD), or a pixel of the spatial light modulator, the ferroelectric modulation layer, or the DMD.

Block 402 represents connecting a circuit 106 (e.g., comparator or similar electronics) to the modulator and the detector. In one or more examples, the circuit is integrated with the modulator, the detector is included in a stack including the modulator and the detector, and/or circuit is physically attached to the modulator and/or the detector so as to form the device that is monolithic or a single piece. In one or more embodiments, the device comprises an integrated circuit including the modulator, the detector, and the circuit.

Block 404 represents the end result, a device 100 including a detector 104 outputting a signal in response to electromagnetic radiation irradiating the detector, the electromagnetic radiation including input electromagnetic radiation 108 having an input field F1. The circuit 106 determines an output phase and/or output amplitude of an output field F2 associated with the input field F1 determined from the signal.

In one or more examples, the circuit 106 performs binary operations comprising classifying the input phase of the input electromagnetic radiation into one of two ranges and setting the modulator into one of two states depending on which range the input phase is classified into.

Examples include, but are not limited to, the following:
1. The circuit 106 determining from the signal whether the input field has an input phase P in a first range or a second range:
   (i) the first range comprising $P>0$ and the second range comprising $P<0$, or
   (ii) the first range comprising $0+B \leq P \leq \pi+B$ and the second range comprising $P<0+B$ or $P>\pi+B$, where $0 \leq B \leq 2\pi$.

In one or more examples, it is desired to be in the correct half of the complex plane (this is why we only need to check whether the phase is above or below a certain value.

The circuit 106 sets the modulator into a first state if the phase P is in the first range and sets the modulator into a second state if the phase P is in the second range.

The modulator 102 in the first state or the second state modulates output electronic radiation so that the output electronic radiation 114, comprising an output amplitude and/or an output phase controlled/configured by the modulator, is transmitted from the modulator 102.

2. The device of embodiment 1, wherein the first range comprises $P>0$ and the second range comprises $P<0$.

3. The device of embodiment 1, wherein the first range comprises $0+B \leq P \leq \pi+B$ and the second range comprises $P<0+B$ or $P>\pi+B$, where $0 \leq B \leq 2\pi$.

4. The device of embodiment 1, wherein the first state sets the output field to have the output phase of $0+C$ radians and the second state sets the output field to have the output phase $\pi+C$, where $0 \leq C \leq 2\pi$.

5. The device of any one of the previous embodiments, wherein the first state comprises the modulator being reflective or emissive and the second state comprises the modulator being non-reflective or non-emissive (e.g., absorbing or causing diffuse reflection), so that output electromagnetic radiation is reflected or emitted from the modulator when the modulator is in the first state and the output electromagnetic radiation is not reflected (or not emitted) from the modulator when the modulator is in the second state. In one example, the output electromagnetic radiation 114 (e.g., comprising reference electromagnetic radiation 116) incident on the modulator is reflected by the modulator in the first state.

6. The device of any one of the previous embodiments, wherein the circuit determines whether the input phase is in the first range or the second range using a process including lock in detection.

7. The device of embodiment 6, wherein the process includes (i) first putting the reference power only on the pixel 304 and then using the circuit to read and record the reference power; (ii) next putting both the signal field and the reference field on the pixel and reading and recording the interference; and (iii) taking the difference between the two readings in (i) and (ii) to find out if the interference is constructive or destructive.

8. The device of any of the previous embodiments, wherein the electromagnetic radiation includes reference electromagnetic radiation; and the circuit:
(i) compares an intensity of the signal outputted from the detector with and without the input field irradiating the detector; and
(ii) determines whether the intensity of the signal increases or decreases in a presence of the input field.

9. The device of any one of the previous embodiments, wherein the circuit automatically sets the modulator into the first state or the second state upon determination of whether the input phase is in the first range or the second range.

10. The device of any one of the previous embodiments, wherein the circuit sets the output phase to minus theta ($-\theta$) when the input field has the input phase of theta $\theta$.

11. The device of any one of the previous embodiments, wherein the circuit sets the output phase to minus theta+/−$\pi/2$ ($-\theta+/-\pi/2$) when the input field has the input phase of theta $\theta$.

12. The device of any one of the previous embodiments, wherein the circuit sets the output phase x to $-\theta-\pi/2 \leq x \leq -\theta+\pi/2$ when the input field has the input phase of theta ($\theta$).

13. The device of embodiments 11 or 12, wherein the output phase is different from $-\theta$ (output phase $\neq -\theta$)

14. The device of any one of the previous embodiments wherein the output field is a phase conjugate field that is a phase conjugate of the input field.

15. The device of any of the previous embodiments, wherein the phases are modulo $2\pi$ (in particular, for the case where a comparison is made with a value B and it is desired to know whether the phase is between the interval [B−$\pi$, $\pi$] or [B, B+$\pi$]).

16. The circuit of any one of the previous embodiments, wherein the circuit is integrated with the modulator and the detector and the input field is not transmitted off the device to an external processor.

17. The device of any one of the previous embodiments, wherein the device comprises an integrated circuit including the modulator, the detector, and the circuit.

18. An apparatus or system comprising a plurality of the devices of any one of the previous embodiments, wherein the devices are disposed in an array and each of the devices comprise a pixel or tile.

19. The device of embodiment 18, wherein the circuit sets the output phase and/or output amplitude of the output field transmitted from each of the pixels so that the output phases and/or output amplitudes vary across the array or from pixel to pixel or from tile to tile.

20. The device of any one of the previous embodiments, wherein the circuit configures or controls the reflectivity/emissivity of the modulator by applying/modulating an electric field applied across liquid crystals between electrodes. The electric field is generated when the circuit applies voltages to the electrodes so as to control the magnitude of the electric field.

21. The device of any one of the previous embodiments, wherein the electromagnetic radiation (reference 116, input 108, output 114) comprises any wavelength, including but not limited to wavelengths corresponding to light (e.g., visible) fields, infrared fields, or ultraviolet fields. The electromagnetic radiation (reference 116, input 108, output 114) typically comprises coherent (e.g., laser) radiation.

In one or more examples, the device 100 comprises a modulator 102 stacked on or above a detector 104; a circuit 106 connected to the modulator 102 and the detector 104, wherein the detector 104 outputs a signal in response to electromagnetic radiation irradiating the detector, the electromagnetic radiation including input electromagnetic radiation 108 having an input field F1; from the signal, the circuit 106 determines an input phase ($\theta$) of the input field F1; the circuit automatically outputs an output phase x as $-\theta-\pi/2 \leq x \leq -\theta+\pi/2$ (with optionally also $x \neq --\theta$) to the modulator 102; and the modulator 102 modulates output electronic radiation 114 so that the output electronic radiation 114 comprising the output phase is transmitted from the modulator 102. In various examples, the circuit is integrated with the modulator and the detector and the input field is not transmitted off the device to a processor.

Operation

Figure 5:
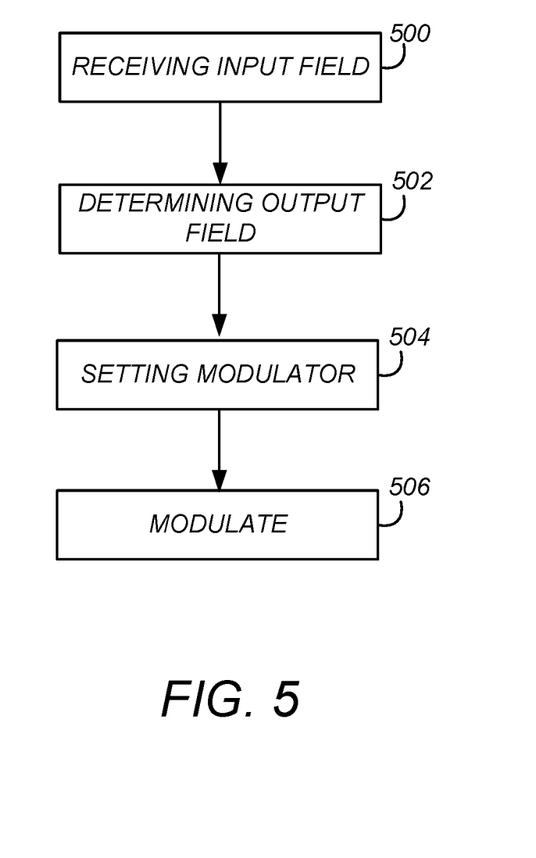
FIG. 5 is a flowchart illustrating a method of operating the device, according to one or more embodiments.

FIG. 5 is a flowchart illustrating a method of outputting an electromagnetic field.

Block 500 represents receiving a signal from a detector in response to electromagnetic radiation irradiating the detector, the electromagnetic radiation including input electromagnetic radiation having an input field. The input electromagnetic radiation may include electromagnetic radiation transmitted/scattered through a turbid, diffusive, or scattering medium (e.g., biological tissue or biological cells).

Block 502 represents using the signal to determine, in a circuit, an output field that is derived from or associated with the input field.

In one or more examples, the step includes determining from the signal whether the input field has an input phase P in a first range or a second range:
(i) the first range comprising P>0 and the second range comprising P<0, or
(ii) the first range comprising 0+B≤P≤$\pi$+B and the second range comprising P<0+B or P>$\pi$+B, where 0≤B≤2$\pi$;

Block 504 represents setting a modulator into a first state if the phase P is in the first range and setting the modulator into a second state if the phase P is in the second range.

Block 506 represents the modulator in the first state or the second state modulating output electronic radiation so that the output electronic radiation, comprising an output amplitude and/or an output phase controlled by the modulator, is transmitted from the modulator.

The output electromagnetic radiation may be transmitted to the turbid, diffusive, or scattering medium (e.g., biological tissue or biological cells) for a particular application. Applications include medical imaging and therapeutics using the output electromagnetic radiation.

REFERENCES

The following references are incorporated by reference herein.

[1] U.S. Pat. No. 9,466,938 Antoine Dupret, Sylvain Gigan, Francois RAMAZ, Gilles Tessier, Arnaud Verdant, Device for measuring and controlling the wave-front of a coherent light beam, 2012, https://www.google.com/patents/U.S. Pat. No. 9,466,938

[2] Laforest, Timothe; Dupret, Antoine; Verdant, Arnaud; Ramaz, Francois; Gigan, Sylvain; Tessier, Gilles; à la Guillaume, Émilie Benoit; A 4000 Hz CMOS image sensor with in-pixel processing for light measurement and modulation, New Circuits and Systems Conference (NEWCAS), 2013 IEEE 11th International 4 Jan. 2013 IEEE

[3] M. Cui and C. Yang; Implementation of a digital optical phase conjugation system and its application to study the robustness of turbidity suppression by phase conjugation; Optics Express 18, pp. 3444-55 (2010).

[4] D. Wang, E. H. Zhou, J. Brake, H. Ruan, M. Jang and C. Yang; Focusing through dynamic tissue with millisecond digital optical phase conjugation; Optica 2, pp. 728-735 (2015).

[5] http://www.forthdd.com, see for example: http://www-.forthdd.com/products/

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device, comprising:
   a modulator stacked on or above a detector;
   a circuit connected to the modulator and the detector, wherein:
      the detector outputs a signal in response to electromagnetic radiation irradiating the detector, the electromagnetic radiation including input electromagnetic radiation having an input field;
      the circuit determines from the signal whether the input field has an input phase P in a first range or a second range:
      (i) the first range comprising P>0 and the second range comprising P<0, or
      (ii) the first range comprising $0+B \leq P \leq \pi+B$ and the second range comprising $P<0+B$ or $P>\pi+B$, where $0 \leq B \leq 2\pi$;
      the circuit sets the modulator into a first state if the phase P is in the first range and sets the modulator into a second state if the phase P is in the second range; and
      the modulator in the first state or the second state modulates output electromagnetic radiation so that the output electromagnetic radiation, comprising an output amplitude and/or an output phase controlled by the modulator, is transmitted from the modulator.

2. The device of claim 1, wherein the first state comprises the modulator being reflective or emissive and the second state comprises the modulator being non-reflective or non-emissive, so that the output electromagnetic radiation is reflected or emitted from the modulator when the modulator is in the first state and the output electromagnetic radiation is not reflected (or not emitted) from the modulator when the modulator is in the second state.

3. The device of claim 2, wherein the first range comprises P>0 and the second range comprises P<0.

4. The device of claim 2, the first range comprises $0+B \leq P \leq \pi+B$ and the second range comprises $P<0+B$ or $P>\pi+B$, where $0 \leq B \leq 2\pi$.

5. The device of claim 1, wherein the first state sets the output field to have the output phase of 0+C radians and the second state sets the output field to have the output phase $\pi+C$, where $0 \leq C \leq 2\pi$.

6. The device of claim 1, wherein the output field is a phase conjugate of the input field.

7. The device of claim 1, wherein the circuit determines whether the input phase is in the first range or the second range using a process including lock in detection.

8. The device of claim 1, wherein the electromagnetic radiation includes reference electromagnetic radiation; and
   the circuit:
      compares an intensity of the signal outputted from the detector with and without the input field irradiating the detector; and
      determines whether the intensity of the signal increases or decreases in a presence of the input field to determine whether the input field has an input phase P in the first range or the second range.

9. The device of claim 1, wherein the circuit automatically sets the modulator into the first state or the second state upon determination of whether the input phase is in the first range or the second range.

10. The device of claim 1, wherein the circuit is integrated or physically attached to the modulator and/or the detector and the input field is not transmitted off the device to a processor.

11. The device of claim 1, further comprising a plurality of the devices disposed in an array, wherein each of the devices comprise a pixel or tile.

12. The device of claim 11, wherein the circuit sets the output phase and/or output amplitude of the output field transmitted from each of the pixels so that the output phases and/or output amplitudes vary across the array or from pixel to pixel or from tile to tile.

13. The device of claim 1, wherein the modulator comprises a spatial light modulator.

14. The device of claim 1, wherein the modulator comprises a ferroelectric modulation layer.

15. The device of claim 1, wherein the modulator comprises a digital micromirror device (DMD).

16. A method of outputting a phase conjugate field, comprising:
   receiving a signal from a detector in response to electromagnetic radiation irradiating the detector, the electromagnetic radiation including input electromagnetic radiation having an input field;
   determining from the signal whether the input field has an input phase P in a first range or a second range:
      (i) the first range comprising P>0 and the second range comprising P<0, or
      (ii) the first range comprising $0+B \leq P \leq \pi+B$ and the second range comprising $P<0+B$ or $P>\pi+B$, where $0 \leq B \leq 2\pi$;
   setting a modulator into a first state if the phase P is in the first range and setting the modulator into a second state if the phase P is in the second range; and wherein
   the modulator in the first state or the second state modulates output electronic radiation so that the output electronic radiation, comprising an output amplitude and/or an output phase controlled by the modulator, is transmitted from the modulator.

17. The method of claim 16, wherein the first state comprises the modulator being reflective or emissive and the second state comprises the modulator being non-reflective or non-emissive, so that the output electromagnetic radiation is reflected or emitted from the modulator when the modulator is in the first state and the output electromagnetic radiation is not reflected (or not emitted) from the modulator when the modulator is in the second state.

18. The method of claim 16, wherein the output field is a phase conjugate of the input field.

19. A device, comprising:
   a modulator stacked on or above a detector;
   a circuit connected to the modulator and the detector, wherein:
      the detector outputs a signal in response to electromagnetic radiation irradiating the detector, the electromagnetic radiation including input electromagnetic radiation having an input field;
      from the signal, the circuit determines an input phase ($\theta$) of the input field;
      the circuit automatically outputs an output phase x as $-\theta-\pi/2 \leq x \leq -\theta+\pi/2$ to the modulator and wherein $x \neq -\theta$; and
      the modulator modulates output electronic radiation so that the output electronic radiation comprising the output phase is transmitted from the modulator.

20. The device of claim 19, wherein the circuit is integrated with the modulator and the detector and the input field is not transmitted off the device to a processor.

* * * * *